US009489940B2

(12) United States Patent
Corfield

(10) Patent No.: US 9,489,940 B2
(45) Date of Patent: Nov. 8, 2016

(54) APPARATUS AND METHODS TO UPDATE A LANGUAGE MODEL IN A SPEECH RECOGNITION SYSTEM

(75) Inventor: Charles Corfield, Boulder, CO (US)

(73) Assignee: NVOQ INCORPORATED, Boulder, CO (US)

( * ) Notice: Subject to any disclaimer, the term of this patent is extended or adjusted under 35 U.S.C. 154(b) by 918 days.

(21) Appl. No.: 13/493,761

(22) Filed: Jun. 11, 2012

(65) Prior Publication Data

US 2013/0332147 A1 Dec. 12, 2013

(51) Int. Cl.
*G10L 15/065* (2013.01)

(52) U.S. Cl.
CPC .................. *G10L 15/065* (2013.01)

(58) Field of Classification Search
CPC ..... G10L 15/00; G10L 15/005; G10L 15/06; G10L 15/063; G10L 15/18; G10L 15/19; G10L 15/065; G10L 15/34; G06F 17/30371; G06F 17/30401; G06F 17/3051; G06F 17/30528; G06F 17/30575; G06F 17/30867; G06F 19/18; G06F 19/22; G06F 19/28; G06F 19/321
USPC ............ 704/201, 251, 252, 256.1, 270, 278, 704/E15.018, E15.008
See application file for complete search history.

(56) References Cited

U.S. PATENT DOCUMENTS

| 5,960,404 | A | 9/1999 | Chaar et al. |
| 5,999,911 | A | 12/1999 | Berg et al. |
| 6,173,266 | B1 | 1/2001 | Marx et al. |
| 7,478,050 | B1 | 1/2009 | Togawa et al. |
| 7,653,566 | B2 | 1/2010 | Kim et al. |
| 7,805,327 | B1 | 9/2010 | Schulz et al. |
| 7,991,764 | B2 | 8/2011 | Rathod |
| 8,160,876 | B2 * | 4/2012 | Dow et al. ..................... 704/244 |
| 8,234,111 | B2 * | 7/2012 | Lloyd et al. .................. 704/233 |
| 8,340,958 | B2 * | 12/2012 | Gruhn ................... G06F 3/0237 704/1 |
| 8,527,270 | B2 * | 9/2013 | Precoda ............... G06F 17/289 704/240 |
| 8,676,580 | B2 * | 3/2014 | Deshmukh ........... G10L 15/197 704/231 |
| 8,719,021 | B2 * | 5/2014 | Koshinaka .................... 704/251 |
| 8,965,763 | B1 * | 2/2015 | Chelba ................. G10L 15/063 704/231 |
| 2003/0036903 | A1 | 2/2003 | Konopka et al. |
| 2004/0193420 | A1 * | 9/2004 | Kennewick et al. ......... 704/257 |
| 2005/0010418 | A1 | 1/2005 | McNair et al. |
| 2006/0122865 | A1 | 6/2006 | Preiss et al. |
| 2006/0149558 | A1 * | 7/2006 | Kahn et al. ................... 704/278 |
| 2007/0038499 | A1 | 2/2007 | Margulies et al. |
| 2007/0233487 | A1 * | 10/2007 | Cohen et al. ................. 704/255 |

(Continued)

FOREIGN PATENT DOCUMENTS

GB     2378002 A     1/2003

OTHER PUBLICATIONS

Korean Intellectual Property Office, International Search Report and Written Opinion for PCT/US2013/044976 dated Aug. 28, 2013.

*Primary Examiner* — Abdelali Serrou
(74) *Attorney, Agent, or Firm* — Perkins Coie LLP

(57) ABSTRACT

The technology of the present application provides a method and apparatus to allow for dynamically updating a language model across a large number of similarly situated users. The system identifies individual changes to user profiles and evaluates the change for a broader application, such as, a dialect correction for a speech recognition engine, as administrator for the system identifies similarly situated user profiles and downloads the profile change to effect a dynamic change to the language model of similarly situated users.

24 Claims, 7 Drawing Sheets

(56) References Cited

U.S. PATENT DOCUMENTS

| | | |
|---|---|---|
| 2009/0099841 A1* | 4/2009 | Chen .................... 704/9 |
| 2009/0144120 A1 | 6/2009 | Ramachandran |
| 2009/0177470 A1 | 7/2009 | Beach et al. |
| 2009/0313017 A1* | 12/2009 | Nakazawa .......... G06F 17/2715 704/244 |
| 2010/0063819 A1* | 3/2010 | Emori ..................... 704/251 |
| 2011/0004462 A1* | 1/2011 | Houghton et al. ........... 704/9 |
| 2011/0035671 A1 | 2/2011 | Iwai et al. |
| 2011/0224981 A1 | 9/2011 | Miglietta et al. |
| 2011/0264451 A1 | 10/2011 | Hoepfinger et al. |
| 2012/0053935 A1 | 3/2012 | Malegaonkar et al. |
| 2012/0143605 A1* | 6/2012 | Thorsen et al. ............ 704/235 |

\* cited by examiner

APPARATUS AND METHODS TO UPDATE A LANGUAGE MODEL IN A SPEECH RECOGNITION SYSTEM

CLAIM OF PRIORITY UNDER 35 U.S.C. §§119 AND 120

None.

REFERENCE TO CO-PENDING APPLICATIONS FOR PATENT

None.

BACKGROUND

1. Field

The technology of the present application relates generally to speech recognition systems, and more particularly, to apparatuses and methods to update a language model associated with speech recognition systems for a number of similarly situated users dynamically rather than statically.

2. Background

The primary means for communication between people is speech. Since the early 1980s, significant progress has been made to allow people to interface with machines using speech through interfaces such as speech to text engines and text to speech engines. The former converts speech to a machine (and user) readable format; the later converts machine readable code to audio signals for people to hear.

Early speech to text engines operated on a theory of pattern matching. Generally, these machines would record utterances spoken by a person, convert them into phoneme sequences and match these sequences to known words or phrases. For example, the audio of "cat" might produce the phoneme sequence "k ae t", which matches the standard pronunciation of the word "cat". Thus, the pattern matching speech recognition machine converts the audio to a machine readable version "cat." Similarly, a text to speech engine would read the word "cat", convert it into a sequence of phonemes, each of which have a known audio signal, and, when concatenated (and appropriately shaped) produce the sound of "cat" (phonetically: "k ae t"). Pattern matching machines, however, are not significantly robust. Generally, pattern matching machines either operate with a high number of recognizable utterances for a limited number of users or operate with a higher number of users but a more limited number of recognizable utterances.

More recently, speech recognition engines have moved to a continuous or natural language speech recognition. The focus of natural language systems is to match the utterance to a likely vocabulary and phraseology and determine how likely the sequence of language symbols would appear in speech. Determining the likelihood of a particular sequence of language symbols is generally called a language model. The language model provides a powerful statistical model to direct a word search based on predecessor words for a span of n words. Thus, the language model will use probability and statistically more likely words for similar utterances. For example, the words "see" and "sea" are pronounced substantially the same in the United States of America. Using a language model, the speech recognition engine would populate the phrase: "Ships sail on the sea" correctly because the probability indicates the word "sea" is more likely to follow the earlier words "ship" and "sail" in the sentence. The mathematics behind the natural language speech recognition system are conventionally known as a hidden Markov model. The hidden Markov model is a system that predicts the next state based on the previous states in the system and the limited number of choices available. The details of the hidden Markov model are reasonably well known in the industry of speech recognition and will not be further described herein.

Generally speaking, speech recognition engines using natural language have users register with an account. More often than not, the speech recognition downloads the recognition application and database to the local device making it a fat or thick client. In some instances, the user has a thin client where the audio is routed to a server that has the application and database that allows speech recognition to occur. The client account provides an audio profile and language model that is tuned to a particular user's voice and speech. The initial training of a natural language speech recognition engine generally uses a number of "known" words and phrases that the user dictates. The statistical algorithms which map audio signals to phonemes are modified to match the user's voice. Subsequent training of the speech recognition engine may be individualized by corrections entered by a user to transcripts when the transcribed speech is incorrect. While any individual user's speech recognition engine is effectively trained to the individual, the training of the language model is potentially inefficient in that common phrases and the like for similarly situated users must be input individually for each installed engine and/or each user. Moreover, changes in language modeling that a single user identifies that would be useful for multiple similarly situated users cannot be propagated through the speech recognition system without a new release of the application and database.

Thus, against this background, it is desirable to develop improved apparatuses and methods to update a language model in a speech recognition system.

SUMMARY

To attain the advantages and in accordance with the purpose of the technology of the present application, an apparatus and method is provided that receives or pulls changes to user profiles and evaluates the individual changes for whether the change would have application over a broader group of similarly situated users of the system. On identification of other similarly situated users, the system and method pushes the change to the language models to the destinations associated with the similarly situated users. By pulling the improvements to the language model for an individual and pushing the improvements across a large number of users, the user profiles for each of the similarly situated users are dynamically updated effectively dynamically changing the language model for the users.

In certain aspects, the profile change is identified by a query or poll from an administrator. In other aspects of the technology, as the user profile is changed, the change is transmitted to the administrator.

The technology in some cases provides an option for updating a user profile by providing a new word and pronunciation of the new word to change a user profile, or by providing a shortcut for a particular word or phrase, or a substitution which formats an existing speech recognition to a desired appearance. In other cases, the user profile may provide for macros or scripts to invoke or activate applications or system navigation based on certain words or commands.

In some embodiments, the technology determines similarly situated user profiles by identifying common attributes in user profiles. The common attributes may include, for example, tags to identify user profiles, common hierarchy in an organization, similar geographical locations, similar age groups, common language models and the like may all be attributes used to determine similarly situated users.

The foregoing and other features, utilities and advantages of the invention will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

The technology of the present application will now be explained with reference to the figures. While the technology of the present application is described with relation to a speech recognition system using natural language or continuous speech recognition, one of ordinary skill in the art will recognize on reading the disclosure that other configurations are possible. Moreover, the technology of the present application will be described with reference to particular discrete processors, modules, or parts, but one of ordinary skill in the art will recognize on reading the disclosure that processors may be integrated into a single processor or server or separated into multiple processors or servers. Moreover, the technology of the present application will be described generically and portions of the present application may be loaded onto a particular user's device (fat or thick client) or hosted by a server that is accessed by the device (thin client). Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
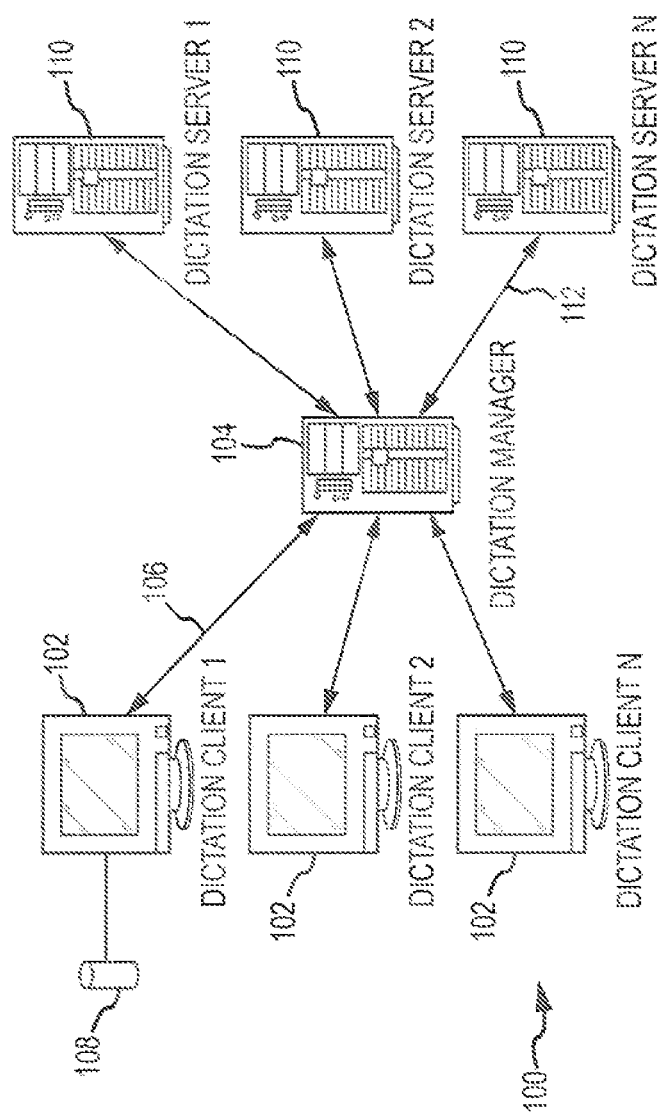
FIG. 1 is a functional block diagram of a distributed speech recognition system consistent with the technology of the present application.

Referring first to FIG. 1, a distributed speech recognition system 100 is shown. Distributed dictation system 100 may provide transcription of dictation in real-time or near real-time allowing for delays associated with transmission time, processing, and the like. Of course, delay could be built into the system to allow, for example, a user the ability to select either real-time or batch transcription services. In operation, distributed dictation system 100 includes one or more client devices 102 that are connected to a dictation manager 104 by a first network connection 106. First network connection 106 can be any number of protocols to allow transmission of audio information, such as, for example, using a standard internet protocol. In certain exemplary embodiments, the first network connection 106 may be associated with a "Cloud" based network. As used herein, a Cloud based network or Cloud computing is generally the delivery of computing, processing, or the like by resources connected by a network. Typically, the network is an internet based network, but could be any public or private network. The resources may include, for example, both applications and data. A conventional cloud computing system will be further explained herein below with reference to FIG. 2. With reference back to FIG. 1, client device 102 receives audio for transcription from a user via a microphone 108 or the like. While shown as a separate part, microphone 108 may be integrated into client device 102, such as, for example, a cellular phone. Also, while shown as a monitor or computer station, client device 102 may be a wireless device, such as a Wi-Fi enabled computer, a cellular telephone, a PDA, a smart phone, mobile computing device, a tablet, or the like.

Dictation manager 104 is connected to one or more dictation servers 110 by a second network connection 112. Second network connection 112 may be the same as first network connection 106, which may similarly be a cloud system. Dictation manager 104 and dictation server(s) 110 may be a single integrated unit connected by a bus, such as a PCI or PCI express protocol. Each dictation server 110 incorporates or accesses a natural language or continuous speech transcription engine as is generally understood in the art. In operation, the dictation manager 104 receives an audio file or stream for transcription from a client device 102. In this description, we use the term audio for both a discrete file as well as a stream because computer programming interfaces treat files and streams very similarly. In practice, an audio file may be transcribed in one step and the resulting text returned to the supplier of the audio, and a stream may be transcribed as audio arrives and the transcription returned incrementally to the caller as the audio is transcribed. Dictation manager 104 selects an appropriate dictation server 110, using conventional load balancing or the like, and transmits the audio to the dictation server 110. The dictation server 110 would have a processor that uses the appropriate algorithms to transcribe the speech using a natural language or continuous speech to text processor. In most instances, the dictation manager 104 uploads a user profile to the dictation server 110. The user profile, as explained above, modifies the language model of the speech to text processer for the user's particular dialect, speech patterns, or the like based on conventional training techniques as are generally known in the industry and not explained herein. The audio, once transcribed by the dictation server 110, is returned to the client device 102 as a transcription or data file. Alternatively, the transcription or data file may be saved for retrieval by the user at a convenient time and place.

Figure 2:
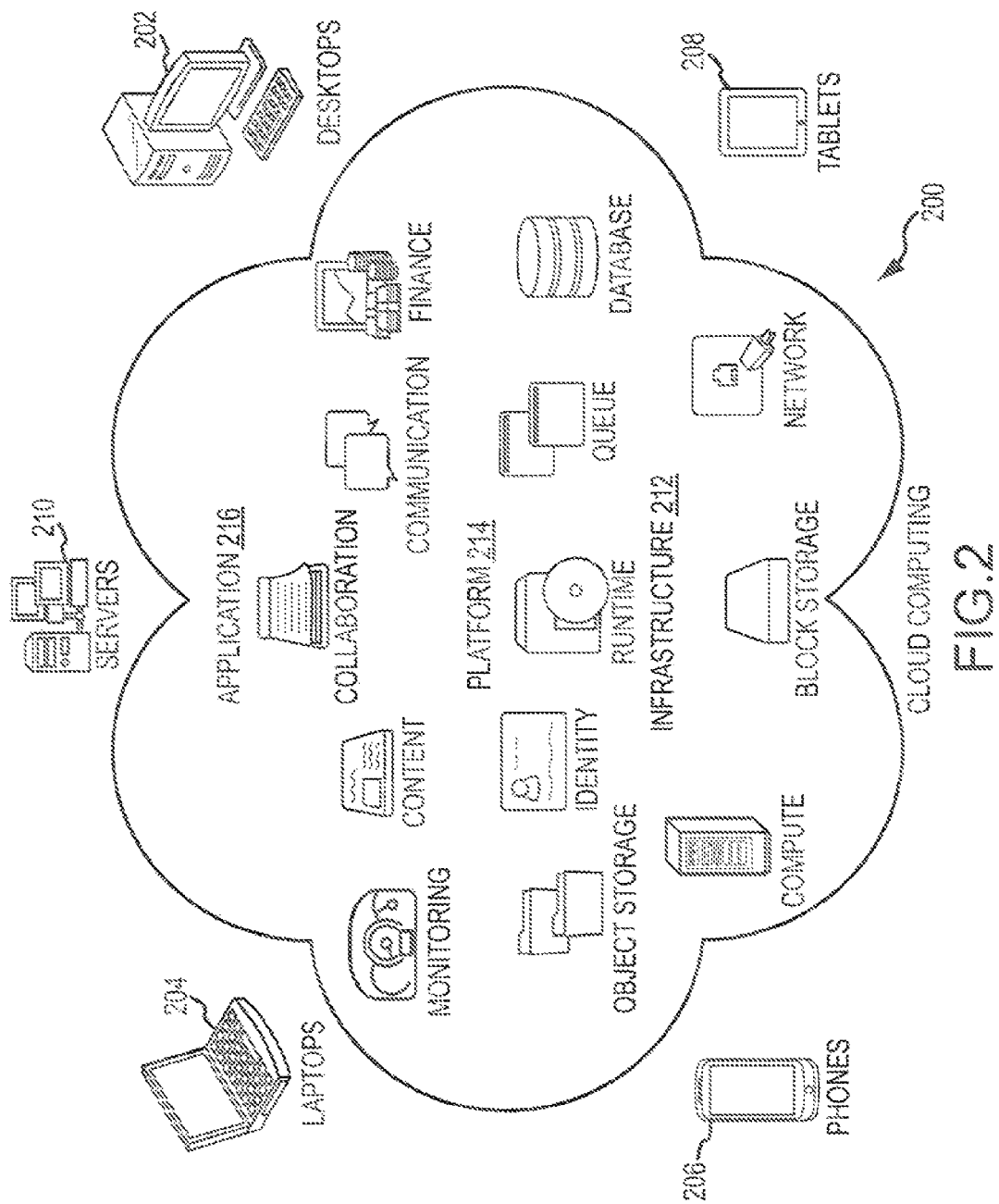
FIG. 2 is a functional block diagram of a cloud computing network consistent with the distributed speech recognition system of FIG. 1.

Referring now to FIG. 2, the basic configuration of a cloud computing system 200 will be explained for completeness. Cloud computing is generally understood in the art, and the description that follows is for furtherance of the technology of the present application. As provided above, cloud computing system 200 is arranged and configured to deliver computing and processing as a service of resources shared over a network. Clients access the Cloud using a network browser, such as, for example, Internet Explorer® from Microsoft, Inc. for internet based cloud systems. The network browser may be available on a processor, such as a desktop computer 202, a laptop computer 204 or other mobile processor such as a smart phone 206, a tablet 208, or more robust devices such as servers 210, or the like. As shown, the cloud may provide a number of different computing or processing services including, infrastructure services 212, platform services 214, and software services 216. Infrastructure services 212 may include physical or virtual machines, storage devices, and network connections. Platform services may include computing platforms, operating systems, application execution environments, databases, and the like. Software services may include applications accessible through the cloud such as speech-to-text software and text-to-speech software and the like.

Figure 3:
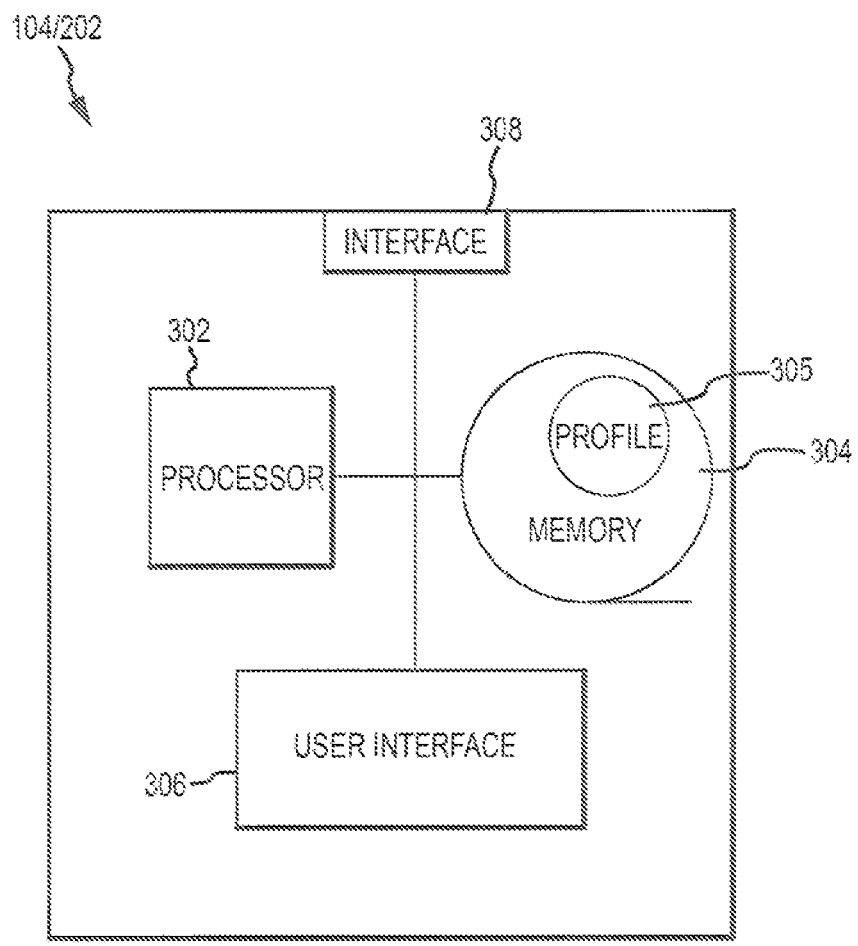
FIG. 3 is a functional block diagram of a computing device consistent with the technology of the present application.

Referring to FIG. 3, dictation manager 104 is shown in more detail. Dictation manager 104 (or managers 104 for a larger system) includes a processor 302, such as a microprocessor, chipsets, field programmable gate array logic, or the like, that controls the major functions of the manager, such as, for example, obtaining a user profile with respect to a user of client device 102, selection of a dictation server 110, or the like. Processor 302 also processes various inputs and/or data that may be required to operate the dictation manager 104. Dictation manager 104 also includes a memory 304 that is interconnected with processor 302. Memory 304 may be remotely located or co-located with processor 302. The memory 304 stores processing instructions to be executed by processor 302. The memory 304 also may store data necessary or convenient for operation of the dictation system. For example, memory 304 may store the transcription for the client so that the transcription may be processed later by the client. At least a portion of memory 304 includes user profiles 305 associated with users of the distributed dictation system. User profiles 305 would be associated with individual users by a pass code, user identification number, biometric information or the like and is usable by dictation servers 110 to facilitate the speech transcription engine in converting the audio to text. Associating users and user profiles using a database or relational memory is not further explained except in the context of the present application. Memory 304 may be any conventional media and include either or both volatile or nonvolatile memory. Dictation manager 104, optionally, may be preprogrammed so as not to require a user interface 306, but typically dictation manager 104 includes user interface 306 that is interconnected with processor 302. Such user interface 306 could include speakers, microphones, visual display screens, physical input devices such as a keyboard, mouse or touch screen, track wheels, cams or special input buttons to allow a user to interact with dictation manager 104. Dictation managers have a network interface 308 (as would the client device and the dictation server) to allow transmissions and reception of data (text, audio, or the like) between networked devices. Client device 102 and dictation servers 110 would have structure similar to the dictation manager.

Dictation manager 104 would accept requests from client device 102 and direct the audio to dictation servers 110 in any of a number of conventional manners. One exemplary methodology is provided in U.S. Pat. No. 7,185,094, issued on Feb. 27, 2007, to Marquette et al., titled Media Session Framework Using a Control Module to Direct and Manage Application and Service Servers, the disclosure of which is incorporated herein by reference as if set out in full. Load balancing between the dictation servers 110 may be accomplished using conventional technology such as the technology associated with U.S. Pat. No. 8,105,689, issued Apr. 3, 2012, to Beach et al., titled Distributed Dictation/Transcription System, the disclosure of which is incorporated herein by reference as if set out in full. Using the methodology, dictation manager 104, for example, would receive a request for dictation services from client device 102. Dictation manager 104 would send a service request to the dictation servers 110 until one of the dictation servers 110 sends back an acceptance of the service request. Dictation server 110 has the user's profile uploaded. Audio would then be streamed from client device 102 to the dictation manager 104 which would in turn stream the audio to dictation server 110. Dictation server 110 would then transcribe the dictation by using the speech transcription engine's language model modified by the user's profile and associated with dictation server 110, and the transcription results would be sent back to client device 102 through the dictation manager 104 as textual data. Alternatively or in combination, dictation manager 104 may cause the textual data to be stored for later retrieval by the user. Also, once the handshake between client device 102 and dictation server 110 is established, dictation manager 104 may be removed from the communication link.

Figure 4A:
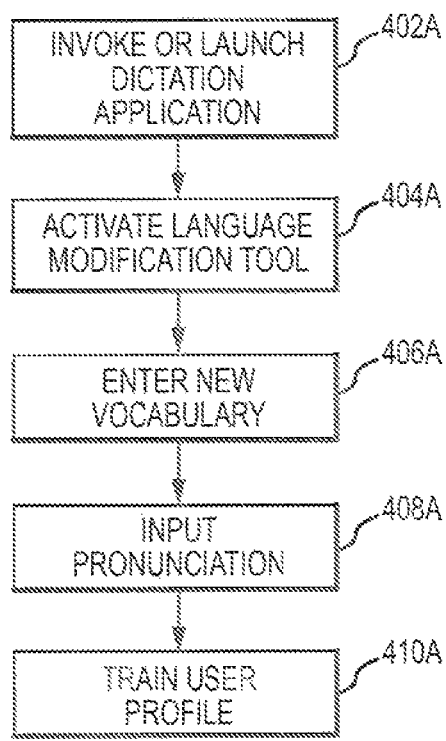
FIG. 4A is a flow chart illustrative of a methodology of modifying a user profile consistent with the technology of the present application.
Figure 4B:
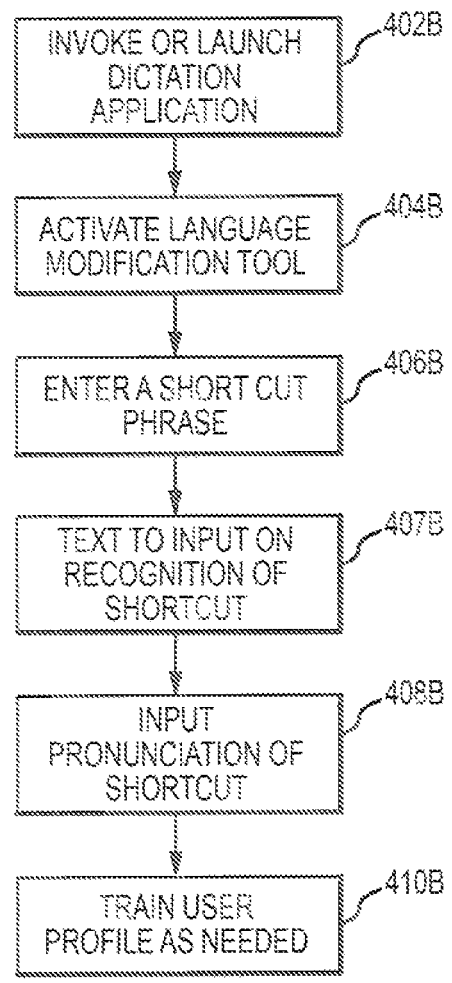
FIG. 4B is another flow chart illustrative of a methodology of modifying a user profile consistent with the technology of the present application.

Referring now to FIGS. 4A and 4B, flow chart 400A and 400B are provided illustrative of methodologies of how a user would modify the user's own profile. For exemplary purposes, we illustrate two types of modification; firstly, modifying the available vocabulary (such as adding new words), and, secondly, adding shortcuts. These are but two examples of possible profile modifications; others, not illustrated here, may include the addition or modification of scripted macros, hot key sequences, the uploading of documents which contain examples of phraseology the user employs so as to refine the language model in the user's profile, and the like. First, to modify the vocabulary available in the user's profile, the client at client device 102 would invoke the dictation application, step 402A, which would cause a user interface to be displayed on the client device 102. Next, the client would open an option for updating the vocabulary, step 404A. For example, the interface may have a simple drop down menu that provides for vocabulary modification. The dictation application would supply a vocabulary modification interface with at least one field to allow the client to enter a vocabulary word, step 406A. Optionally, the interface may provide a recording field associated with the modification interface to allow the client to provide a pronunciation of the entered vocabulary word, step 408A. The vocabulary word and optional pronunciation would be used to modify the user profile in a conventional manner, step 410A. Instead of vocabulary words, a client may supply a shortcut as shown by a flow chart 4008 in FIG. 4B. Flow chart 400B is substantially the same as flow chart 400A, but at step 406B, the client enters a shortcut phrase, with an optional pronunciation of the phrase for recordation at step 408B. Additionally, the client would enter on the modification interface the textual data associated with the shortcut phrase, step 407B. For example, the client may desire a shortcut for a call center application associated with customer complaints for cellular telephone service. As such, the shortcut phrase may be the word "connectivity." The applicable textual data transcribed when the client utters the word "connectivity" may return something like: "The customer noticed a failure of voice communication while traveling on the highways between heavily populated areas." This is but one limited example of many optional shortcuts. Moreover, using the above tools, particular utterances may be tuned to a specific use associated with the client such as, for example, where a common utterance may have a particular spelling or such associated with a user who is, for example, in the medical field, legal field, or the like.

As can be appreciated by the above, while the above ability to fine tune a particular user's profile is functional, it is not efficient for propagating changes to similarly situated users. Using the above methodology, each individual user would need to recognize the utility of the potential new word, revised word, shortcut, or the like and make the same or a similar change to his profile. This may result in multiple variations on the same improvements, which could lead to problems, inconsistencies, and the like. Moreover, each new client would receive a language model that is the original language model without any of the potentially beneficial modifications. Thus, it is desirable for an administrator of the dictation system to monitor new words, training changes, shortcuts, or the like (generically referred to as "Profile Changes") to a user profile (generically referred to as the originating user profile) to determine whether any originating user profiles have Profile Changes that would be useful to a group of similarly situated users.

Figure 5:
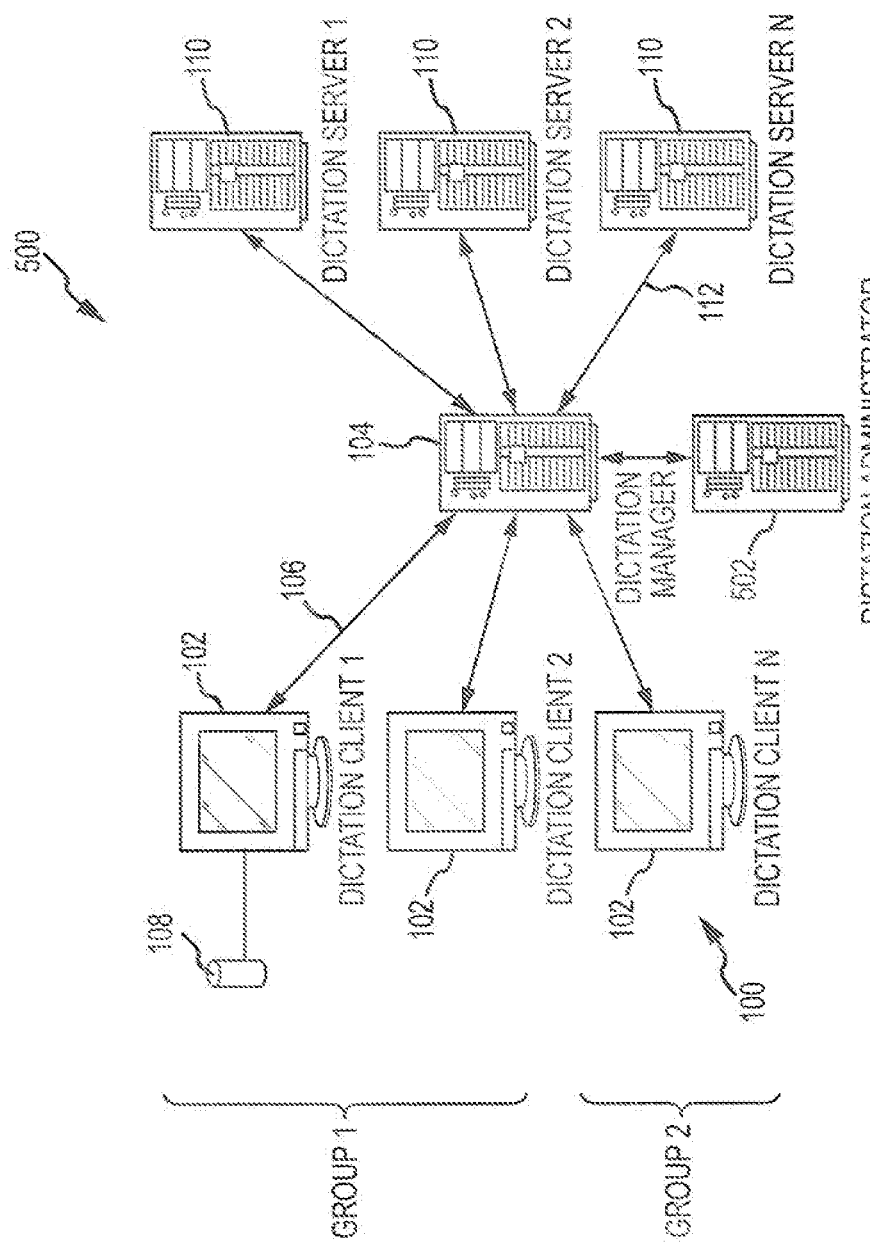
FIG. 5 is a functional block diagram of the distributed speech recognition system consistent with the technology of the present application.

With reference to FIG. 5, a distributed speech recognition system 500 is shown. The distributed speech recognition system 500 is similar to distributed speech recognition system 100 explained above and includes one or more client devices 102, a dictation manager 104, a first network connection 106; one or more dictation servers 110, and a second network connection 112. Additionally, distributed speech recognition system 500 includes a dictation administrator 502. The dictation administrator 502 may be incorporated into dictation manager 104. Alternatively, dictation administrator 502 may be incorporated into one or more of client devices 102. The dictation administrator 502 may have structure similar to the dictation manager 104 described above. Moreover, dictation administrator 502 may group similarly situated users or client devices 102, such as group 1 and group 2 as shown (although any number of groups are possible). While shown as distinct groups, group 1 and group 2 may overlap or group 2 may be a species of a broader group 1 and the like.

Figure 6:
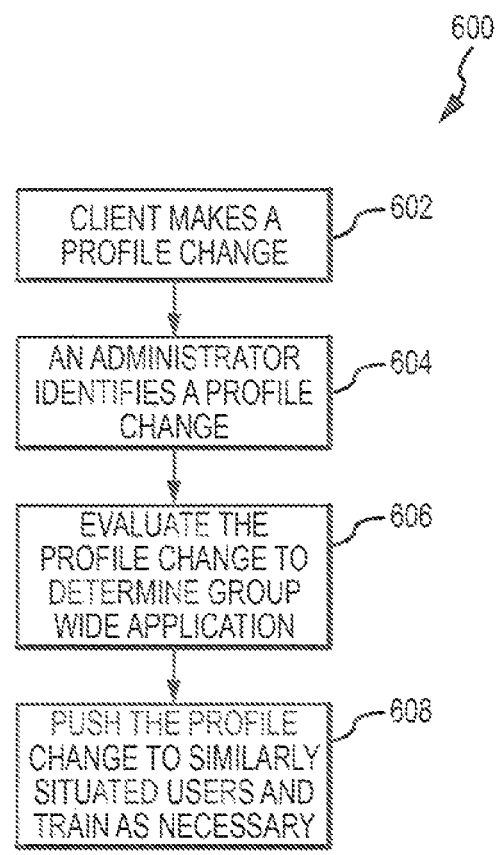
FIG. 6 is a flow chart illustrative of a methodology of pushing profile changes of FIGS. 4A and 4B to similarly situated users.

Referring now to FIG. 6, a flow chart 600 is provided illustrative of a methodology of how the dictation administrator 502 pulls Profile Changes from the originating user profile and applies the same to at least one other similarly situated user (sometimes generically referred to as a "destination user profile") as identified by a group, such as group 1 above. First, a client makes a Profile Change as explained, for example, above, step 602 (or other Profile Changes not specifically outlined). Next, the dictation administrator identifies a Profile Change, step 604. The dictation administrator 502 may poll the dictation manager for Profile Changes. If the originating user profile is stored on client device 102, the dictation administrator 502 may poll the client devices 102. Alternatively, the dictation administrator 502 or client device 102 transmits the Profile Change or a tag that the originating user profile has been changed to name just some options regarding alerting the administrator to the change. Next, the dictation administrator 502 evaluates the Profile Change or Profile Changes to determine whether the Profile Change(s) have a group wide application, step 606. The evaluation may involve receiving an indication that the Profile Change increased the efficiency, such as, for example, increased the dictation words per minute of the client as automatically evaluated by the dictation manager or dictation administrator. The evaluation may be that multiple clients implemented similar or the same change. The evaluation may be that the shortcut replaces similar transcription data in multiple user profiles. These are but a few samples of evaluations. Next, the Profile Change(s) are pushed to the destination user profiles of the other clients in the group, which change is used to train and modify the language model in a conventional manner, step 608. Thus, the language model for a group of similarly situated users is dynamically updated.

While the above FIG. 5 identifies a group of similarly situated users, it is possible to provide different mechanisms to identify users that would benefit from a dynamic change to the user profile. In certain aspects of the technology, the technology of the present application will be implemented in a vertically integrated system where users are grouped in a tree like structure. Thus, a group may be indicated by users that are lower in the tree structure. For example, a first line manager may have three distinct engineering groups reporting to the first line manager. Each of the three distinct engineering groups has an engineering manager as a direct report to the first line manager. One of the three distinct engineering managers may have two project leaders as direct reports. Finally, the one of the two project leaders may have a group of engineers working on the project. In this example, which should not be construed as limiting but rather explanatory, one group of users includes the engineering managers, the project leaders, and the group of engineers who are downstream of the first line manager.

Another group includes a group of engineers under a project leader. As can be appreciated, any particular user can be in multiple groups. A direct report or tree structure as described above is a reasonably straightforward way to group users to identify similarly situated users. However, in today's cloud systems, it is sometimes difficult to identify direct hierarchies. Another way to group similarly situated users may include, for example, assigning a tag to the user. Thus, when pushing updates, the data administrator 502 would only cause the updates to be pushed to accounts having a particular tag. For example, if a user account includes a medical specialty language model, such as, for example, a neurosurgical language model, the account may be tagged. When any dynamic changes to the neurosurgical language model are authorized, the update is only pushed to the tagged users and not necessarily to all users. Again, any particular user may have several tags. In many instances, the groups can be established automatically by identifying features of the user. As shown above, the user account for the medical specialty may automatically tag a user. Other occupational groupings are possible as well. For example, iPhone application programmers may be grouped; Bloomingdale's buyers may be grouped, etc. Other groupings may include other indicia of the users in the group, such as regional (by a Postal Zip Code, for instance, in the United States) as users in the same region likely have similar language patterns, age, hobbies, activity groups, social media groups, etc. to name but a few indicia that may act to signal a potential grouping. The above are but some exemplary forms of attributes that may be used to identify similarly situated users, which are generically referred to as attributes.

The dynamic updates are described with reference to vocabulary, sentence structures, and shortcuts for a language model of a speech to text or text to speech engine. The rapid and dynamic propagation of updates does not need to be limited to language models. In certain aspects of the technology of the present application, a user in a group may develop a command, a key stroke application, a macro, or a script, etc. that facilitate common actions. Similar to the above, an administrator or manager associated with the group of users may be alerted to the macro or script and evaluate the efficiencies garnered. The administrator or manager may push the macro or script to similarly situated users that have similar needs and will experience similar efficiencies. In one example, users may frequent a plurality of news pages in a particular order for updated, online news information. Thus, a command, such as, for example, "News" may navigate the user to a particular internet news page by opening the systems network browser, entering the URL, and displaying the information. In some aspects, the command "News" may take the user to multiple pages based on the URL after a certain delay at any particular URL or other unique address for the information. In other situations, the command may have a number of similar commands, such as, for example, the command "News1" displays www.cnn.com, "News2" displays www.foxnews.com, "News3" displays www.msnbc.com, etc. Rather than an audio command as contemplated above, the same command could be associated with a particular key stroke, icon click, or the like. Each of these items may be pulled by the administrator or manager from one or more users in a group and subsequently pushed to all the similarly situated users.

While described above as the administrator pushing the dynamic update to the user, the administrator may instead publish the available updates pulled from the various users. The other similarly situated users may elect to subscribe or not to the update. Additionally, whether pushed by the administrator or accepted by the user, such a dynamic update may be provided with an explanation or other help regarding the dynamic update. Such help may be that XYZ tool is now available, a warning that the audio phrase "widget" will now launch a network browser and navigate to a particular URL, a description of a shortcut, or a vocabulary change.

Figure 7:
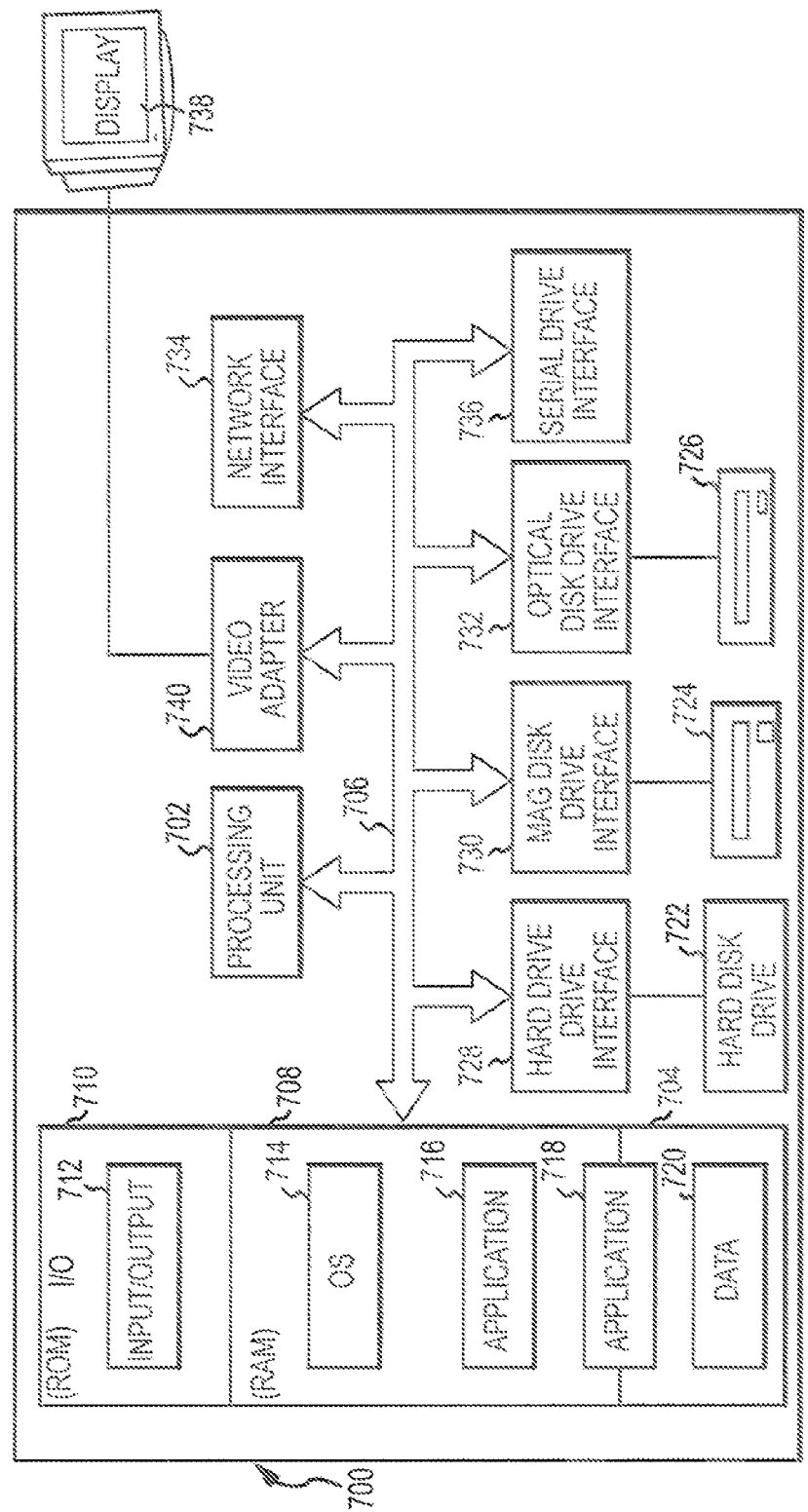
FIG. 7 is a functional block diagram of a workstation of FIGS. 1 and 5 consistent with the technology of the present application.

Referring now to FIG. 7, a functional block diagram of a typical client device 700 for the technology of the present application is provided. Client device 700 is shown as a single, contained unit, such as, for example, a desktop, laptop, handheld, or mobile processor, but workstation 700 may comprise portions that are remote and connectable via network connection such as via a LAN, a WAN, a WLAN, a WiFi Network, Internet, or the like. Generally, workstation 700 includes a processor 702, a system memory 704, and a system bus 706. System bus 706 couples the various system components and allows data and control signals to be exchanged between the components. System bus 706 could operate on any number of conventional bus protocols. System memory 704 generally comprises both a random access memory (RAM) 708 and a read only memory (ROM) 710. ROM 710 generally stores a basic operating information system such as a basic input/output system (BIOS) 712. RAM 708 often contains the basic operating system (OS) 714, application software 716 and 718, and data 720. System memory 704 contains the code for executing the functions and processing the data as described herein to allow the present technology of the present application to function as described. Workstation 700 generally includes one or more of a hard disk drive 722 (which also includes flash drives, solid state drives, etc., as well as other volatile and non-volatile memory configurations), a magnetic disk drive 724, or an optical disk drive 726. The drives also may include zip drives and other portable devices with memory capability. The drives are connected to the bus 706 via a hard disk drive interface 728, a magnetic disk drive interface 730 and an optical disk drive interface 732, etc. Application modules and data may be stored on a disk, such as, for example, a hard disk installed in the hard disk drive (not shown). Workstation 700 has network connection 734 to connect to a local area network (LAN), a wireless network, an Ethernet, the Internet, or the like, as well as one or more serial port interfaces 736 to connect to peripherals, such as a mouse, keyboard, modem, or printer. Workstation 700 also may have USB ports or wireless components, not shown. Workstation 700 typically has a display or monitor 738 connected to bus 706 through an appropriate interface, such as a video adapter 740. Monitor 738 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor for dynamically updating a group of similarly situated user profiles, the method comprising the steps of:
receiving over a communication link at least one profile change to an originating user profile entered by a user at a client device;
evaluating the efficiency of the at least one profile change;
determining that the at least one profile change is applicable to at least one similarly situated user profile based at least in part on the evaluated efficiency;
transmitting over the communication link the at least one profile change to a destination user profile to automatically update the destination user profile,
wherein the group of similarly situated user profiles is updated dynamically based on the at least one profile change to the destination user profile,
wherein the updated destination user profile is used to train and update a language model for a speech recognition engine,
wherein the updated language model is utilized, by the speech recognition engine, to transcribe speech into text, and
wherein the transcribed text is displayed on a user device.

2. The method of claim 1 wherein the step of receiving over a communication link at least one profile change comprises:
polling a plurality of user profiles to determine whether the user profiles have received at least one user initiated profile change; and
pulling the at least one user initiated profile change to be received.

3. The method of claim 2 wherein the step of polling comprises the step of querying for profile changes.

4. The method of claim 1 wherein the step of transmitting over the communication link the at least one profile change to the destination user profile includes the step of displaying a user profile update to alert a destination user of the at least one profile change.

5. The method of claim 1 wherein the destination user profile comprises a plurality of user profiles similarly situated to the originating user profile.

6. The method of claim 5 further comprising the step of determining a first group of user profiles that are similarly situated to the originating user profile.

7. The method of claim 6 wherein the step of determining the first group of user profiles that are similarly situated to the originating user profile includes identifying at least one common attribute.

8. The method of claim 7 wherein the at least one common attribute comprises tags associated with the plurality of user profiles.

9. The method of claim 7 wherein the at least one common attribute comprises a hierarchy of the plurality of user profiles in an organization.

10. The method of claim 7 wherein the at least one common attribute comprises a geographical location.

11. The method of claim 7 wherein the at least one common attribute comprises a language model.

12. The method of claim 1 wherein the at least one profile change is a change to the language model for the speech recognition engine.

13. The method of claim 1 wherein the at least one profile change is selected from a group of profile changes consisting of: shortcuts, macros, hot key sequences upload, commands, navigation, or a combination thereof.

14. The method of claim 12 further comprising:
originating the at least one profile change to the language model of the originating user profile, wherein originating the at least one profile change comprises:
inputting a new word to the language model;
inputting a pronunciation of the new word to the language model; and
training the originating user profile based on the new word and new pronunciation.

15. The method of claim 12 further comprising:
originating the at least one profile change to the language model of the originating user profile, wherein originating the at least one profile change comprises:
inputting a shortcut to the language model;
inputting transcription text to be transcribed when the shortcut is spoken; and
training the language model.

16. The method of claim 12 further comprising:
originating the at least one profile change to the language model of the originating user profile, wherein originating the at least one profile change comprises:
correcting a transcription text with corrected text; and
training the originating user profile based on the correction.

17. An apparatus for dynamically updating a plurality of user profiles for similarly situated users comprising:
an administrator workstation coupled to a network and configured to receive at least one modification to at least a first user profile associated with a group of user profiles;
the administrator workstation comprising a processor configured to evaluate the efficiency of the at least one modification;
the administrator workstation configured to determine that the at least one modification is applicable to at least one second user profile that has at least one common attribute as the first user profile based at least in part on the evaluated efficiency; and
the administrator workstation configured to modify the at least one second user profile with the at least one modification from the first user profile,
wherein a language model of the second user profile is dynamically trained and updated by the at least one modification,
wherein the updated language model is utilized, by a speech recognition engine, to transcribe speech into text, and
wherein the transcribed text is displayed on a user device.

18. The apparatus according to claim 17 wherein the administrator workstation is configured to poll the group of user profiles for the at least one modification.

19. The apparatus according to claim 17 wherein the administrator workstation dynamically updates the at least one second user profile without action by a user of the second user profile.

20. The apparatus according to claim 19 wherein the administrator workstation transmits an update summary to the workstation of the second user profile wherein a user at the workstation is alerted to the dynamic update.

21. The apparatus according to claim 17 wherein the administrator workstation transmits an update summary of the at least one modification to the workstation of the at least one second user profile and dynamically updates the at least one second user profile on acceptance by a second user.

22. The apparatus according to claim 17 wherein the administrator workstation determines the at least one common attribute by evaluating identification tags linked to each user profile of the group of user profiles.

23. A method performed on at least one processor for dynamically updating a group of similarly situated user profiles with new words, wherein the new words are not contained in a language model, the method comprising the steps of:
   polling a plurality of client devices to determine that at least one user has added at least one new word to a vocabulary on at least one of the plurality of client devices;
   pulling from the at least one of the plurality of client devices the at least one new word for the language model;
   evaluating the efficiency of the language model;
   determining that the language model is applicable to at least one similarly situated user based at least in part on the evaluated efficiency;
   transmitting over the communication link the new word to a destination user profile to automatically update the destination user profile,
   wherein the group of similarly situated user profiles is updated dynamically based on the new word,
   wherein the updated destination user profile is used to train and update a destination language model,
   wherein the destination language model is utilized, by a speech recognition engine, to transcribe speech into text, and
   wherein the transcribed text is displayed on a user device.

24. The method of claim 23 wherein the step of pulling from the at least one of the plurality of client devices the new word for the language model comprises pulling an audio file of a pronunciation of the new word.

* * * * *